Figure 1:
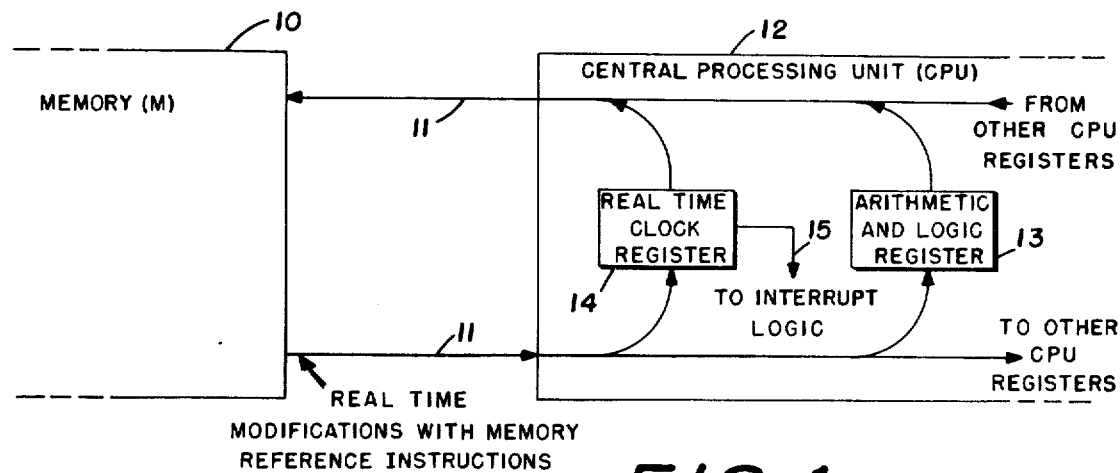

United States Patent [19]

Perschy

[11] 3,999,169

[45] Dec. 21, 1976

[54] REAL TIME CONTROL FOR DIGITAL COMPUTER UTILIZING REAL TIME CLOCK RESIDENT IN THE CENTRAL PROCESSOR

[75] Inventor: James A. Perschy, Laurel, Md.

[73] Assignee: The United States of America as represented by the Secretary of the Navy, Washington, D.C.

[22] Filed: Jan. 6, 1975

[21] Appl. No.: 538,656

[52] U.S. Cl. .......................................... 340/172.5
[51] Int. Cl.² ........................................ G06F 9/18
[58] Field of Search .................. 340/172.5; 445/1

[56] References Cited
UNITED STATES PATENTS

| | | | |
|---|---|---|---|
| 3,513,445 | 5/1970 | Harmon et al. | 340/172.5 |
| 3,566,369 | 2/1971 | Chinlund | 340/172.5 |
| 3,566,386 | 2/1971 | Blauw | 340/172.5 |
| 3,623,007 | 11/1971 | Eckhart et al. | 340/172.5 |
| 3,668,646 | 6/1972 | Hemdal | 340/172.5 |
| 3,678,463 | 7/1972 | Peters | 340/172.5 |
| 3,691,531 | 9/1972 | Saltini et al. | 340/172.5 |
| 3,750,107 | 7/1973 | Pyne | 340/172.5 |
| 3,789,365 | 1/1974 | Jen et al. | 340/172.5 |
| 3,792,438 | 2/1974 | Hurst | 340/172.5 |
| 3,812,472 | 5/1974 | Mahood | 340/172.5 |

*Primary Examiner*—Mark E. Nusbaum

[57] ABSTRACT

The proposed real time clock control of a computer system is implemented as a programmer's working register in the central processing unit, instead of as an auxiliary subsystem in the input-output logic. Implemented in this manner, the real time clock is modifiable with memory reference instructions, to facilitate changes in the real time clock overflow interrupt interval and the storage of the real time clock value in a read-write memory.

5 Claims, 2 Drawing Figures

REAL TIME CONTROL FOR DIGITAL COMPUTER UTILIZING REAL TIME CLOCK RESIDENT IN THE CENTRAL PROCESSOR

BACKGROUND AND SUMMARY OF THE INVENTION

In the typical prior art application involving use of a general purpose digital computer, system timing is normally controlled by a master clock subsystem typically located in the input-output logic portion of the overall computing system. Generally, the master clock unit of the computer system is a source of fixed or constant timing.

It is proposed in accordance with the present invention to provide a method and apparatus for providing high speed real time control utilizing a real time clock (RTC) resident in the central processing unit of the system. As a result, this real time clock arrangement may be operated on directly by memory reference instructions, thus facilitating changes in the real time clock overflow interrupt interval and also permitting storage of the real time clock value in the computer memory. Moreover, the present invention permits the computer to operate at higher real time clock interrupt rates which are of particular importance for wideband data formatting applications.

In view of the above, one object of the present invention is to provide high speed real time control for a computer system using a real time clock resident in the central processor unit.

A further object of the present invention is to provide a computer real time clock system which responds to stored instructions from the computer memory, whereby the real time clock interrupt interval is modifiable automatically, as desired.

Figure 2:
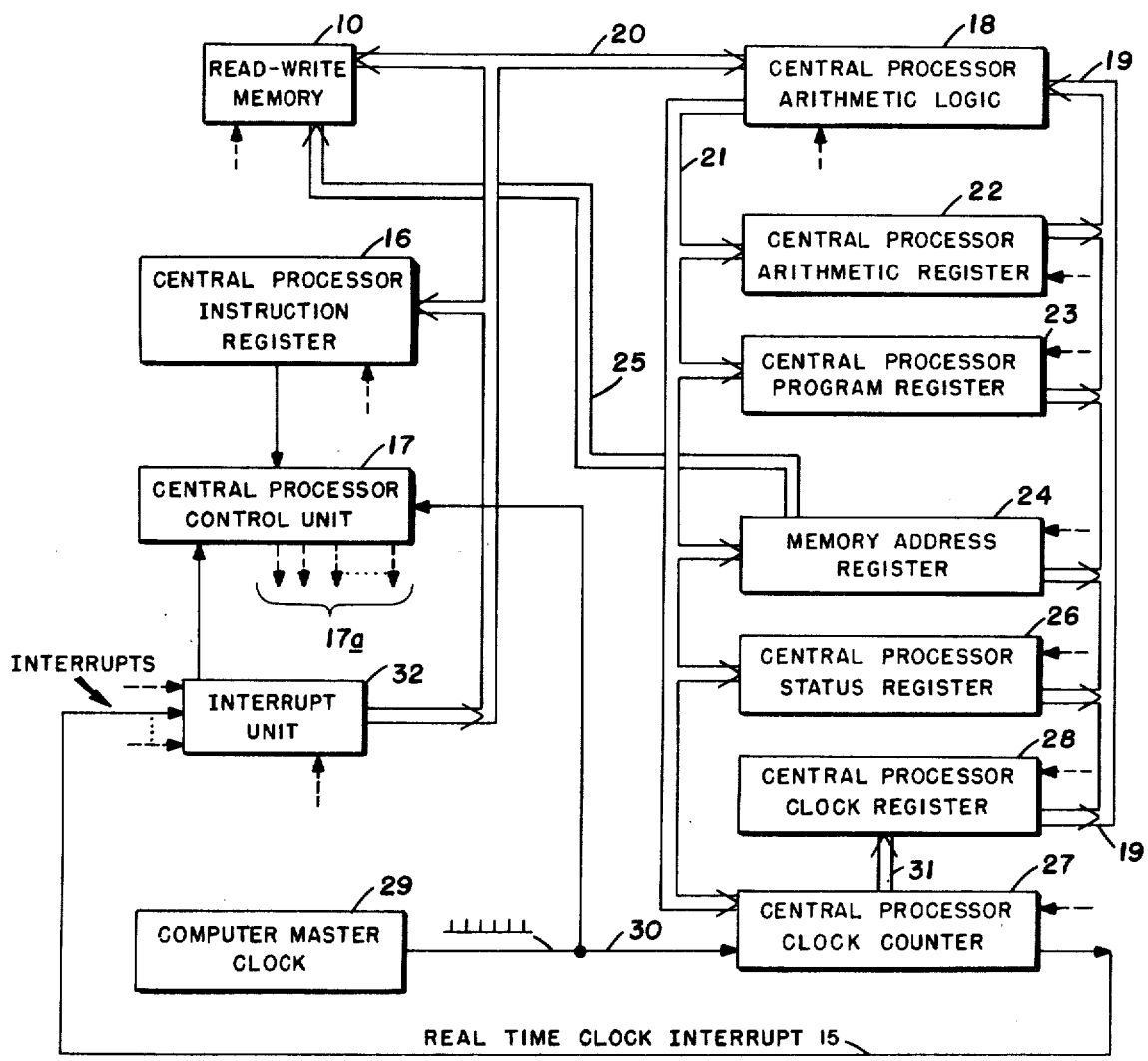

Other objects, purposes and characteristic features of the present invention will in part be pointed out as the description of the invention progresses and in part be obvious from the accompanying drawings, wherein:

FIG. 1 is a generalized block diagram illustrating the memory and central processing unit (CPU) of a typical general purpose digital computer and illustrating the proposed real time clock (RTC) register resident in the CPU; and FIG. 2 is a more detailed block diagram of the proposed high speed real time control system of the present invention utilizing a real time clock (RTC) resident in the CPU.

Referring to the generalized block diagram of FIG. 1, a typical general purpose digital computer includes, among its major components, a memory unit 10 which is operably connected, via a plurality of output/input data busses 11 to the central processor unit 12 which, as is well-known to those skilled in the art, contains various registers, control units and logic circuitry to store, route and process data to and from the memory 10, in accordance with stored programs. In the general block diagram of FIG. 1, by way of example, the illustrated register 13 might represent the main arithmetic and logic operations register of the central processing unit 12, which operations would typically include ADD, SUBTRACT, AND, INCLUSIVE OR, EXCLUSIVE OR, SHIFT, and COMPARE operations. This same register 13 may also be used as an input/output register, as desired.

In accordance with the illustrated embodiment of the present invention, the central processing unit also includes a real time clock register 14 which would include, as will be described, a multi-bit digital counter whose count is synchronized with the computer system's master clock and the contents of which may be modified by LOAD, ADD, or SUBTRACT instructions. Moreover, the register 14 may be read into the memory 10 or to the other registers contained in the central processing unit 12. As shown in FIG. 1, the real time clock register 14 produces an output interrupt signal on the illustrated line 15 which is fed back to the interrupt logic portion of the computing system, as will be described.

Referring now to the more detailed block diagram shown in FIG. 2, the typical central processor components include: an instruction register 16 which holds the current instruction being executed; a control unit 17 which controls, as represented by the dotted output arrows 17a, the data flow paths within the system; arithmetic logic 18 which operates on inputs from data busses 19 and 20 and outputs the result on data bus 21; arithmetic register(s) 22 which holds intermediate arithmetic results and may be used for indexing; a program register 23 which holds the address of the next instruction to be executed within the system; a memory address register 24 which keeps track of the current address being in the read-write memory 10 and also addresses this memory via the data bus 25; and, a status register 26 which holds carry and overflow flag bits from the various arithmetic operations and also registers interrupt masks.

In accordance with the present invention, the typical central processor is modified to have resident therein a clock counter 27 and a clock register 28. In the presently preferred embodiment, the clock counter 27 is a synchronous binary preset counter which is operably connected to be triggered from the computer master clock unit 29 over line 30. As is well-known to those skilled in the art, the computer master clock 29, might, for example, comprise a stable high frequency oscillator, at say 5 MHz, with suitable digital outputs to provide the necessary clock signals to the computer. At the end of each master clock pulse interval, the contents of the clock counter 27 are transferred to the clock register 28 via the illustrated data bus 31, while the clock counter 27 begins the next count interval. Moreover, the clock counter 27 can, as will be described, be preset from the data bus 21.

Together, the clock register 28 and the counter 27 function as a real time clock which is implemented as a programmer's working register in the central processing unit. As shown in FIG. 2, the counting operations within the clock counter 27 are synchronized with the clock execution cycles of the over-all central processor by means of simultaneous clocking of the control unit 17 and the counter 27 with the same clock signals on line 30 from the master clock unit 29. When the clock counter 27 overflows, the most significant counting stage of the counter 27 is used as an interrupt signal, on line 15, to the CPU interrupt line 32, to thereby initiate a real time clock interrupt operation within the computing system.

As indicated above, the block diagram of FIG. 2 represents the typical components of a conventional general purpose digital computer, except for the provision of the clock counter 27 and clock register 28 which are added in accordance with the present invention. By way of examples, the block diagram of FIG. 2 applies to such well-known general purpose minicomputers as the PDP-11 and the NOVA machines, so that the various units indicated in block diagram form in FIG. 2 are all well known to those of ordinary skill in the art. In particular, the control unit 17 is a conventional component of all general purpose digital computers and its purpose is to implement, depending upon the requirements of practice, the operational sequence for the particular computer employed. The over-all structure and operation of such a unit is described in detail for example in the well-known reference, Arithmetic Operations in Digital Computers (pp. 314 through 353), R. K. Richards, copyright 1955 by D. Van Nostrand Co., Inc. The other blocks shown in FIG. 2 also represent circuitry well-known to computer circuit designers. By way of example, the arithmetic logic unit 18 could be the type described at pages 381 through 391 of the reference, TTL Data Book for Design Engineers, copyrighted 1973 by Texas Instruments, Inc.; whereas, the clock counter 27 is described in detail at pages 427 through 431 of this same Texas Instruments (TI) manual; the master clock 29 (which is merely a pulse generator) might be of the well-known form shown at page 82 of the TI manual; and the interrupt unit 32 might take the form shown at page 290 of this same reference manual.

During the processing subroutine of the real time clock interrupt 15, the interrupt is removed by adding a number to the clock counter 27 which resets the most significant stage of the counter 27. This number addition to the counter 27 also establishes the time interval to the next real time clock interrupt appearing on line 15. In particular, the number addition to the counter 27 is accomplished with a central processing unit type instruction in a manner similar to that by which a number addition would be performed to an arithmetic register 22. During one cycle time of this instruction, the contents of the clock register 28 are thus placed on the data bus 19 and the number to be added to it is taken typically from the read-write memory 10 and placed on data bus 20. The arithmetic logic circuitry 18 then generates the sum of these two numbers and outputs such sum on the data bus 21. At the end of the clock cycle, the contents of the data bus 21 are preset into the clock counter 27. The clock counter 27 on the other hand, does not count during this interval. On the next clock cycle the contents of the counter 27 is transferred to the clock register 28 from where it can be read back into the memory unit 10 as desired.

Obviously, however, it is not necessary that a clock register 28 be provided in order to provide the real time clock operation in the central processing unit; i.e., only the clock counter 27 which provides the actual RTC interrupt is required to form the register represented at 14 in FIG. 1. On the other hand, the combined operation of the clock counter 27 and clock register 28 minimize prolongation delays between the clock pulses on clock line 30, such that the real time clock need not limit the operating speed of the central processing unit.

As noted previously, the proposed real time clock control offers the significant advantage of flexibility, particularly as to modifying the RTC overflow interrupt interval, when compared to the prior art technique of implementing the RTC control in the input-output portion of the computing system. Obviously, the specific details of how a particular RTC subroutine would be implemented depends upon the requirements of practice, i.e., the intended application for the system, such as for example, whether real time read-out only is required or is real time control of event sequencing also desired. By way of example, detailed disclosure of how RTC subroutines would be implemented in the input-output sections of a general purpose digital computer system is contained in the following two prior art system manuals:

Xerox SIGMA 2/3 Computers Real-Time and Batch Processing Reference Manual, dated October 1972 Chapter entitled "Real-Time Programming" Section 6, Pages 63 through 74 Control Data Corp. (CDC) 3100 through 3500 Computer Systems Real/Time Scope Reference Manual, dated October 1966. Chapter 6 entitled "Interrupt Control" Pages 6–1 through 6–10 How such prior art RTC subroutines would be modified in accordance with the present invention is made clear from the foregoing discussion of the structure and operation of the clock counter 27 and clock register 28.

Various modifications, adaptations and alterations of the present invention are of course possible in light of the above teachings. It should be understood therefore that within the scope of the appended claims, the invention may be practiced otherwise than as described hereinabove.

What is claimed is:

1. A system for providing real time clock control within the central processing unit of a programmed digital computer system having a read-write memory means operably connected by a plurality of input and output data flow paths to and from said central processing unit comprising, in combination,
    a source of master clock pulses,
    a clock counter means triggerable by said master pulse clock pulses for counting said clock pulses,
    control means for selectively controlling said data flow paths in accordance with programmed instructions and being operably connected to said master clock pulse source, whereby said control means is synchronized with said clock counter means,
    logic means operably interconnecting said memory means and said clock counter means for permitting said clock counter means to be preset to a selected counting state with reference instruction data from said memory means,
    interrupt means operably connected to said control means to initiate an interrupt operation within said computer system, and
    means operably connecting said clock counter means to said interrupt means for initiating an interrupt operation dependent upon the counting state of said clock counter means.

2. The real time clock control combination specified in claim 1 further including a clock register means connected to said clock counter means for registering the clock pulse count of said counter means.

3. The combination specified in claim 2 wherein said clock register means is operably connected to said logic means to cause said logic means to respond to the clock pulse count of said counter means.

4. The combination specified in claim 1 wherein said clock counter means is a synchronous binary preset counter.

5. The combination specified in claim 1 wherein said means operably connecting said clock counter means to said interrupt means is responsive to an overflow condition at said clock counter means to produce an interrupt initiate signal for said interrupt means.

* * * * *